Nov. 24, 1931.   F. E. TOMLINSON   1,833,342
BATTERY LIFTING TONGS
Filed July 25, 1930

INVENTOR
Francis E. Tomlinson
BY
Augustus B. Stoughton
ATTORNEY.

WITNESS:

Patented Nov. 24, 1931

1,833,342

UNITED STATES PATENT OFFICE

FRANCIS E. TOMLINSON, OF PHILADELPHIA, PENNSYLVANIA

BATTERY LIFTING TONGS

Application filed July 25, 1930. Serial No. 470,601.

The object of my invention is to produce a pair of tongs for handling storage batteries and for like purposes. These tongs are designed to be economical to manufacture and to be efficient and practical for use.

For a further exposition of my invention reference may be had to the annexed drawings and specification at the end whereof my invention will be specifically pointed out and claimed.

Figure 2:
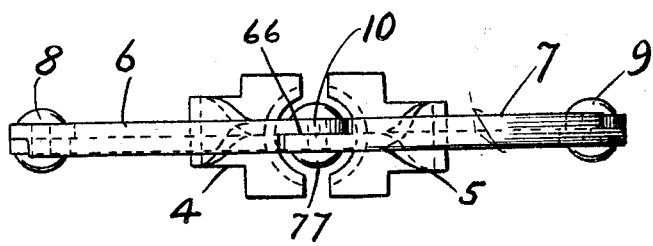
Figure 2 is a plan view.

In the embodiment chosen for illustration in the drawings there are disclosed my improved tongs which consist of a pivotal rivet 1 having rounded heads. Pivotally mounted on this rivet are claw arms 2 and 3 which have at their lower ends claws 4 and 5 respectively. These claws may be of any suitable shape but are preferably of the shape shown having projecting side edges and a circular central portion in their confronting faces.

Figure 1:
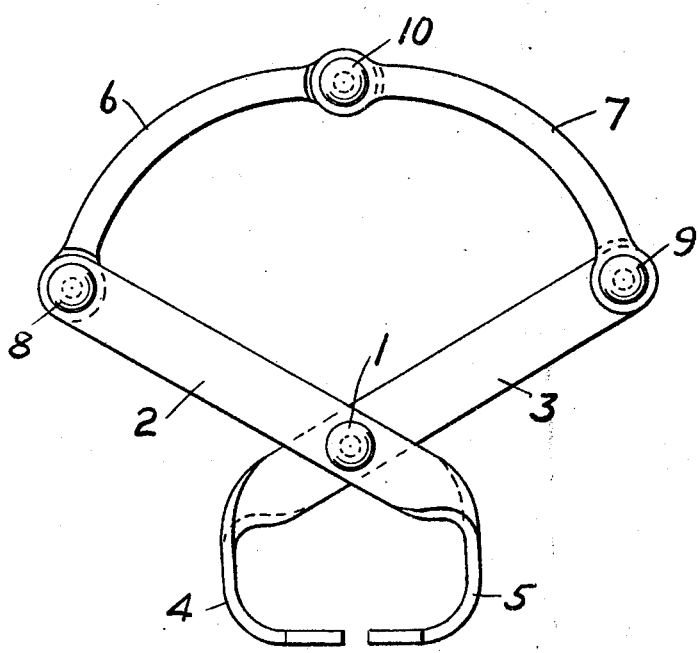
Figure 1 represents a side elevation of my improved tongs.
Figure 3:
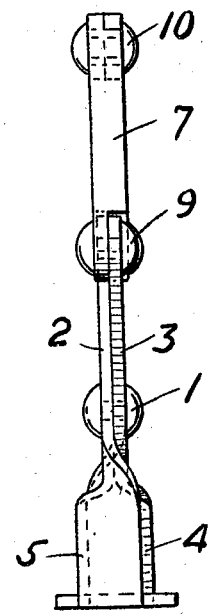
Figure 3 is an end view.

At their opposite ends claw arms 2 and 3 have pivotally mounted thereon handle arms 6 and 7. The handle arms are respectively attached to claw arms by rivets 8 and 9 which have rounded heads. At their opposite ends the handle arms have offset portions 66 and 77 respectively. The offset portions are approximately half the thickness of the main portion of the arm so that when the two offset portions are placed side by side they form a smooth joint of the same thickness as the remaining portion of the handle arms. All the edges of the handle arms are carefully rounded and are not left sharp. The offset portions 66 and 77 may be made of rounded shape as best seen in Figure 1 if desired. The handle arms 6 and 7 are curved in their longest dimension so as to be fitted to a shape most suitable to be grasped by a man's hand. The offset portions are adapted to be connected by a rivet 10 having rounded heads. It will thus be seen that the handle arms 6 and 7 provide a suitable means for grasping the tongs which is nevertheless rounded and smooth so that the hand of the operator is not cut, bruised or fatigued thereby.

I do not intend to be limited in the practice of my invention save as the scope of the prior art and the attached claims may require.

I claim:

1. Battery lifting tongs comprising a pair of pivotally mounted claw arms, claws on said arms, a rivet forming a pivot for said arms, and curved handle arms pivotally attached to said claw arms and to each other forming a handle.

2. Storage battery tongs comprising in combination a pair of claw arms, claws on said arms, a rivet forming a pivot for said claw arms, curved handle arms pivotally connected to said claw arms at the opposite ends from the claws, offset portions of approximately half the thickness of said handle arms, and a smooth round-headed rivet connecting said handle arms at said offset portions.

FRANCIS E. TOMLINSON.